United States Patent [19]

Durrant

[11] 4,061,533

[45] Dec. 6, 1977

[54] CONTROL SYSTEM FOR A NUCLEAR POWER PRODUCING UNIT

[75] Inventor: Oliver W. Durrant, Bath Township, Summit County, Ohio

[73] Assignee: The Babcock & Wilcox Company, New York, N.Y.

[21] Appl. No.: 616,693

[22] Filed: Sept. 25, 1975

[51] Int. Cl.² ............................................. G21C 7/00
[52] U.S. Cl. .................................... 176/20 R; 176/22; 176/24
[58] Field of Search .......................... 176/20 R, 22, 24

[56] References Cited

U.S. PATENT DOCUMENTS

| | | | |
|---|---|---|---|
| 2,989,453 | 6/1961 | Esselman et al. | 176/20 R |
| 3,008,889 | 11/1961 | Junkins | 176/20 R |
| 3,042,600 | 7/1962 | Brooks | 176/20 R |
| 3,061,533 | 10/1962 | Shannon et al. | 176/20 R |
| 3,253,994 | 5/1966 | Kagi | 176/20 R |
| 3,434,924 | 3/1969 | Pouderoux | 176/20 R |
| 3,630,839 | 12/1971 | Podolsky | 176/20 R |
| 3,671,390 | 6/1972 | Hogle | 176/20 R |
| 3,778,347 | 12/1973 | Giras et al. | 176/20 R |

Primary Examiner—Samuel W. Engle
Assistant Examiner—S. A. Cangialosi
Attorney, Agent, or Firm—J. M. Maguire; John F. Luhrs

[57] ABSTRACT

A co-ordinated control system for a nuclear power producing unit having a pressurized water reactor, a plurality of once through steam generators through which the coolant from the reactor is circulated in parallel, and a turbine generator supplied steam from the steam generators for the production of electric power.

15 Claims, 3 Drawing Figures

CONTROL SYSTEM FOR A NUCLEAR POWER PRODUCING UNIT

This invention relates to a control system for a nuclear power producing unit having a reactor in which a coolant, such as water under high pressure, is heated and circulated in parallel through a plurality of steam generators supplying steam to a prime mover such as a turbine generator. As an order of magnitude, the reactor in such a unit may have a heat output of upwards of 3,400 Mw and a net electric output of 1,200 Mw.

In accordance with the invention a primary feed forward control signal corresponding to the desired or demand power output adjusts, in parallel, through separate discrete control loops, the reactor heat output required to satisfy the power demand, and the total rate of feedwater flow to and steam flow from the steam generators required to maintain critical system parameters at set point.

Further in accordance with the invention the feed forward control signal to each discrete control loop is modified by the time integral of the difference between demand and actual power outputs to thereby continuously calibrate, under steady state conditions, changes in reactor heat output required to satisfy the power demand because of changes in cycle efficiency and the corresponding changes in total rate of feedwater flow to and steam flow from the steam generators required to maintain critical system parameters at set point.

Further in accordance with the invention the feed forward control signal to each discrete control loop is further modified in proportion to transient changes in the difference between demand and actual power outputs and critical system parameters.

Further in accordance with the invention the relative rates of feedwater flow to the steam generators are additionally adjusted in proportion to changes in the relative rates of coolant flows through the steam generators.

Further in accordance with the invention the relative rates of feedwater flows to the steam generators are further adjusted in accordance with the difference in temperatures of the feedwater entering the steam generators.

Further in accordance with the invention the relative rates of feedwater flows to the steam generators are additionally adjusted in accordance with the time integral of the difference between the average coolant temperatures in the steam generators.

These and further objectives of the invention will be apparent as the description proceeds in connection with the drawings, in which:

IN THE DRAWINGS

DETAILED DESCRIPTION

Figure 1:
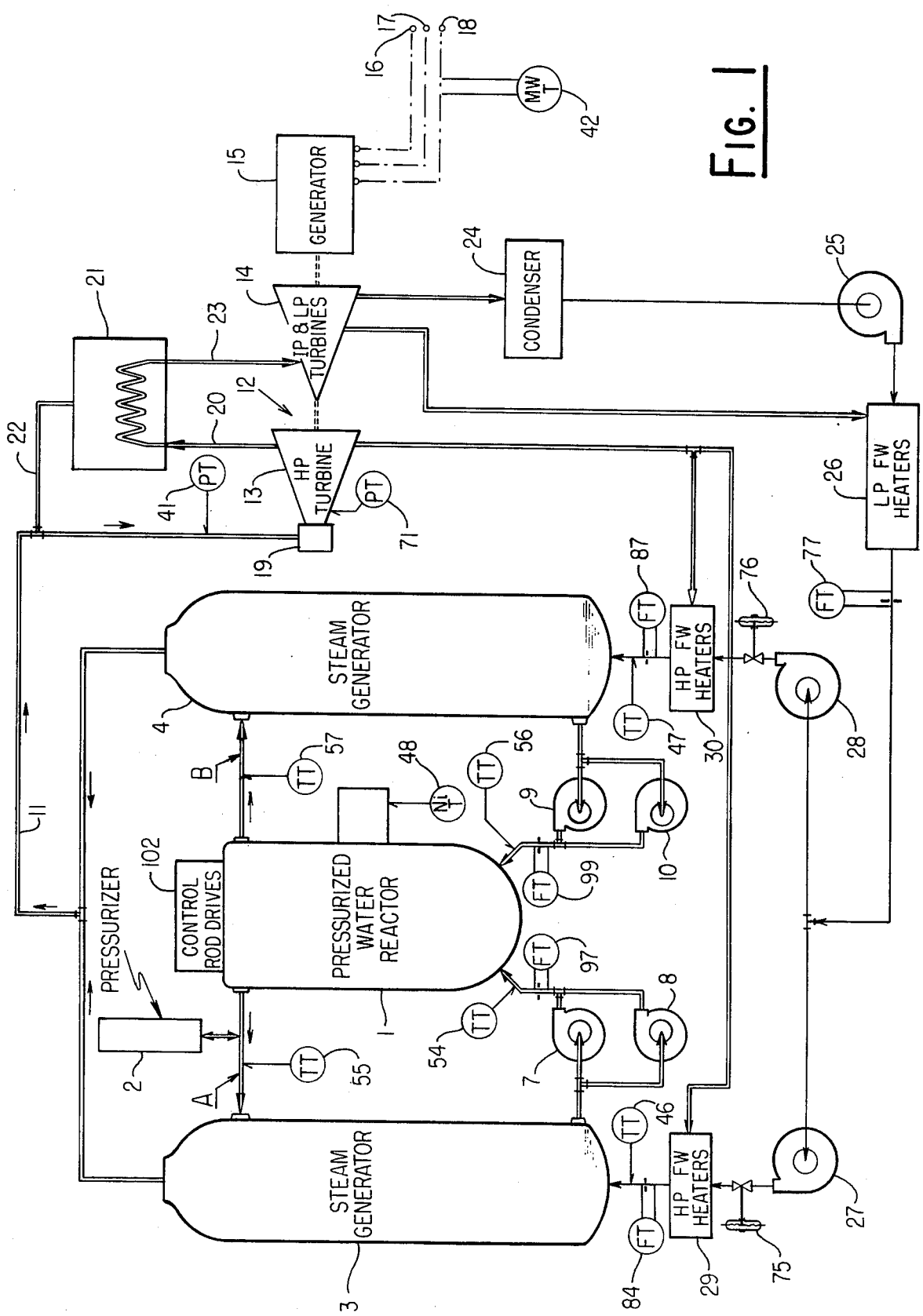
FIG. 1 is a schematic of a pressurized water nuclear power producing unit in which are referenced the primary controllers and final control elements utilized in the control system shown in FIGS. 2 and 3.

Referring to FIG. 1, there is shown a pressurized water reactor 1 which is maintained at a predetermined operating pressure by means of a pressurizer 2. Reactor coolant, i.e., pressurized water, is circulated through the reactor 1 and once-through steam generators 3 and 4 through parallel coolant flow loops A and B respectively. Coolant flow through loop A is established and maintained by circulating pumps 7 and 8 arranged in parallel, whereas coolant flow through loop B is established and maintained by similar circulating pumps 9 and 10.

Steam from the generators 3 and 4 is transported through a conduit 11 to a turbine unit, generally indicated at 12, having a high pressure (HP) unit 13 and one or more intermediate and low pressure (IP and LP) units as indicated at 14. The HP unit 13 and IP and LP units 14 drive a single generator 15 producing electric power transmitted therefrom by conductors 16, 17 and 18. Alternately, each turbine unit may be arranged to drive a separate generator all feeding into a common buss.

Steam is admitted to the HP unit 13 through a conventional flow control valve unit, shown diagramatically at 19, and discharged therefrom through a conduit 20 to a reheater 21 provided with heating steam from conduit 11 through branch conduit 22. The hot reheat steam is then transported through a conduit 23 to the IP and LP units 14 and is discharged therefrom into a condenser 24. Condensate from condenser 24 is pumped by condensate pump 25 through a low pressure heater string 26, heated by extraction steam from IP and LP units 14. Feedwater is drawn in parallel from the low pressure heater string 26 by boiler feed pumps 27 and 28. Feedwater discharged from boiler feed pump 27 passes through high pressure heaters 29, heated by extraction steam from HP unit 13, into steam generator 3. Feedwater discharged from boiler feed pump 28 passes through high pressure heaters 30, heated by extraction steam from HP unit 13, into steam generator 4.

Figure 2:
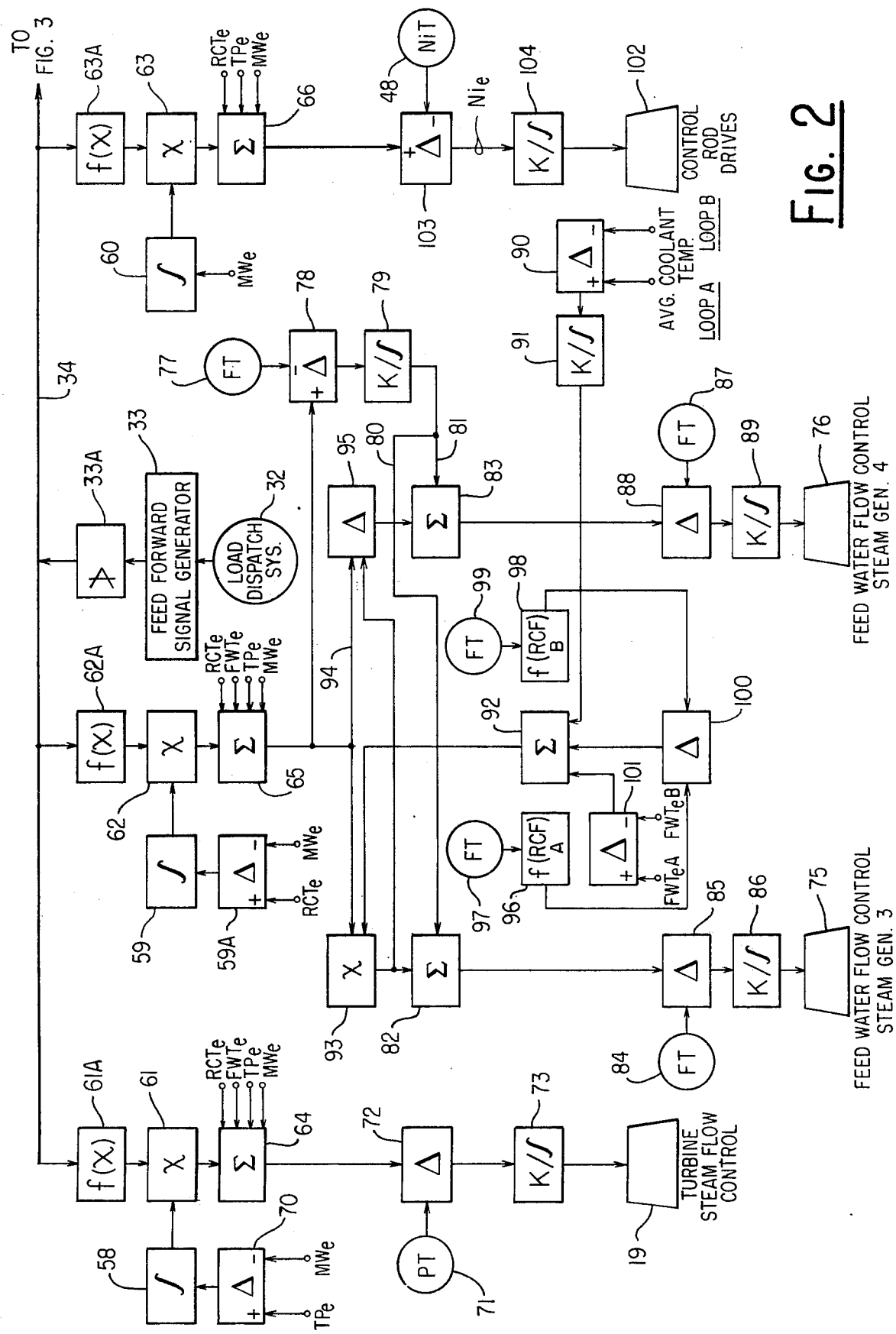
FIG. 2 is a logic diagram of a control system embodying the invention as applied to the nuclear power producing unit shown in FIG. 1.

As shown in FIG. 2, which is a logic diagram of the control system unit load demand may be established by an automatic load dispatch system, as shown at 32, or by other automatic or manual means, inputing to a primary feed forward control signal generator 33, the purpose of which is to generate a feed forward control signal corresponding to the desired or demand power output of the power producing unit. The feed forward primary control signal, with a maximum limit established in unit 33A corresponding to the capability of the reactor under maximum load conditions with all auxiliary equipment in operation, transmitted over signal conductor 34, adjusts in parallel through individual discrete control loops, steam flow to the HP turbine unit 13, total feedwater flow to the steam generators 3 and 4 and neutron power or heat output ($N_d$) of the reactor 1 to substantially maintain actual power output of the power producing unit equal to the demand power output.

The feed forward primary control signal inputs to the individual discrete control loops through function generators 61A, 62A and 63A, the purpose of which is to modify the primary feed forward control signal so that under normal operating conditions and cycle efficiency there will be established the reactor heat release required to satisfy the then existing demand for power and the total rate of feedwater flow to and steam flow from the steam generators required to maintain critical system parameters at set point. Each control loop is further provided with individual modifying signals, as hereinafter described more in detail, so that actual power output is maintained precisely equal to the demand power output and the critical system parameters are maintained at set point, notwithstanding changes in cycle efficiency and/or changes in operating conditions.

In reference to the drawings, it should be noted that conventional control logic symbols have been used. The control components, or hardware, as it is sometimes called, which such symbols represent, are commercially available and their operation well understood. Further, conventional logic symbols have been used to avoid identification of the control system with a particular type of control, such a pneumatic hydraulic, electronic, electric, digital or a combination of these, as the invention may be incorporated in any one of these types. Further to be noted, the primary controllers shown in the logic diagrams have been referenced into FIG. 1 as have the final control elements.

In FIG. 2 the modifying signals, one or more of which are applied separately to each individual, discrete control loop are identified as megawatt error ($MW_e$), throttle pressure error ($TP_e$), feedwater temperature error ($FWT_e$), and reactor coolant temperature error ($RCT_e$).

Figure 3:
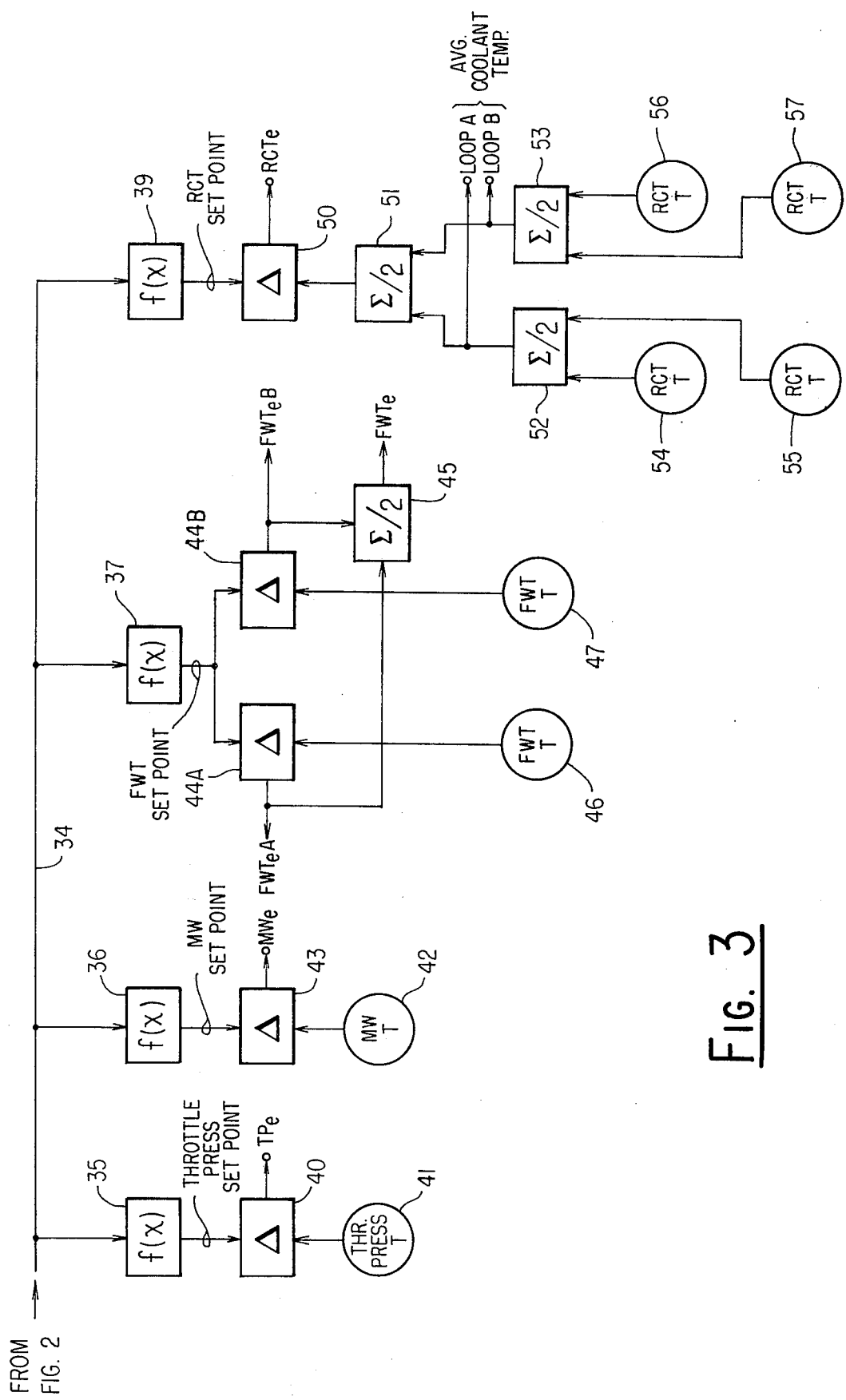
FIG. 3 is a logic diagram illustrating typical arrangements for determining the deviation of critical system parameters from set point.

FIG. 3 is a logic diagram of the sub-loops for the generation of these modifying signals. The feed forward control signal is transmitted over signal conductor 34 to function generators 35, 36, 37, and 39, the purpose of each being to condition the feed forward control signal so that the output signal therefrom is representative of the correct or set point value of the variable with which it is associated for the then existing magnitude of the primary feed forward control signal.

Function generator 35 generates a set point signal corresponding to the correct throttle pressure for the existing primary feed forward control signal which is compared in a difference unit 40 with a signal generated in throttle pressure transmitter 41 and producing an output signal corresponding to throttle pressure error ($TP_e$).

An error signal corresponding to megawatt error ($MW_e$) is generated by comparing the output signal from function generator 36 to the output signal generated in megawatt transmitter 42 in a difference unit 43.

A signal corresponding to average feedwater temperature error ($FWT_e$) is generated by averaging the feedwater temperature errors, ($FWT_eA$) and ($FWT_eB$), in loops A and B respectively. Thus, as shown, the output signal from function generator 37, representing the normal feedwater temperature in relation to load demand, with all extraction feedwater heaters in service and operating normally, is compared, in difference unit 44A, with a signal corresponding to the actual feedwater temperature in loop A, generated in feedwater temperature transmitter 46. Similarly, the output signal from function generator 37 is compared in difference unit 44B with a signal corresponding to the actual feedwater temperature in loop B, generated in feedwater temperature transmitter 47. The output signals from difference units 44A and 44B input to summing unit 45 generating an output signal ($FWT_e$) corresponding to the average feedwater temperature error.

A signal corresponding to reactor coolant temperature error ($RCT_e$) is generated by comparing, in difference unit 50, the output signal from function generator 39 with a signal corresponding to the average reactor coolant temperature generated in summing unit 51 from signals generated in summing units 52, 53. Summing unit 52 averages the signals generated in temperature transmitters 54, 55 corresponding to the temperature of the coolant entering and leaving the reactor 1 in coolant loop A. Similarly, summing unit 53 averages the signals generated in temperature transmitters 56, 57 corresponding to the temperature of the coolant entering and leaving the reactor 1 in coolant loop B.

As evident from an inspection of FIG. 2, the itemized error signals are applied to one or more computing units. To avoid undue complexity in the drawings, the error signal conductors from difference units 40, 43, 45 and 50 have not been shown, it being evident, for example, that signal ($TP_e$) generated in difference unit 40 is applied to those computing units showing a ($TP_e$) input.

In regard to the discrete control loops shown in FIG. 2 for turbine steam flow, feedwater flow and reactor heat output it will be noted that certain error signals are introduced through integrating units 58, 59 and 60, the output signals therefrom being transmitted to multiplying units 61, 62 and 63 respectively and serve to apply a steady state calibration correction to the primary feed forward control signal. Other signals, as shown, are introduced into summing units 64, 65 and 66 and serve to apply bias corrections to the primary feed forward control signal proportional to transient changes in the error signals. The particular error signals applied to make a steady state calibration correction or applied to make a bias and transient correction are dependent upon the discrete control loop in question.

With respect of the reactor heat output control loop, a modified feed forward control signal, as established by function generator 63A, operates control rod drives 102 to maintain the reactor heat output equal to that required to satisfy load demand under steady state conditions. Megawatt error is introduced, to provide a steady state calibration correction, through integrating unit 60 and multiplying unit 63. Signals providing a bias and transient correction corresponding to reactor coolant temperature error, throttle pressure error and megawatt error are introduced through summing unit 66. Control rod drives 102 are positioned to maintain actual reactor heat output in correspondence with the control signal from summing unit 66 by means of a local feedback loop comprising a difference unit 103 in which the output signal from summing unit 66 is compared with a signal corresponding to actual neutron power ($N_i$) generated in neutron power transmitter 48. The output signal from difference unit 103 through proportional plus integral unit 104 controls the operation of control rod drives 102 to maintain actual neutron power equal to that required to maintain the power output of the power producing unit at that value established by summing unit 66.

With respect of the turbine steam flow control loop, the modified feed forward control signal operates turbine control valves 19. (The control signal transmitted to control valves 19 can, through analogue to digital circuitry and the like, be adapted to any particular type of turbine valve control mechanism). Throttle pressure error, introduced through integrating unit 58 serves to decrease turbine valve position and thus the demand for steam flow upon a decrease in steam pressure below set point and vice versa. In order to prevent improper steady state corrections to steam flow, a signal proportional to megawatt error is subtracted from throttle pressure error in difference unit 70. Signals corresponding to average coolant temperature error, feedwater temperature error, throttle pressure error and megawatt error are applied as properly gained bias corrections to the feed forward control signal in summing unit 64. In operation, a decrease in average coolant temperature effects a decrease in turbine steam flow; a decrease in feedwater temperature, such as caused by the outage of a feedwater heater, effects a decrease in steam flow to compensate for the decrease in extraction flow and thus avoids the transient increase in power output that would otherwise result; a decrease in throttle pressure effects a decrease in turbine steam flow; and a decrease in power output effects a corresponding increase in turbine steam flow. The proportional corrections applied through summing unit 64 act to stabilize operation of the power producing unit during transient conditions. The control signal from summing unit 64 is transmitted to the final control element, turbine control valves 19.

In order that a consistent relationship will exist between the control signal from unit 64 and rate of turbine steam flow, a local feedback loop is provided. A signal corresponding to actual turbine steam flow is generated in first stage pressure transmitter 71 and compared with the output signal from unit 64 in difference unit 72. The signal generated in proportional plus integral unit 73 adjusts the turbine control valves as required to maintain the signal generated in transmitter 71 equal to the output signal from summing unit 64.

As apparent from the foregoing description turbine steam flow control valves 19 are positioned as required to maintain the turbine steam flow demanded by the output signal from summing unit 64. If desired, and as described in U.S. Pat. No. 3,894,396 which issued on July 15, 1975, limit controls may be introduced into the steam flow control loop whereby the rate of steam flow to the turbine is adjusted as required to prevent throttle pressure excursions from set point exceeding predetermined limits.

With respect of the feedwater flow control, total feedwater flow is maintained in proportion to a discreet modified feed forward control signal and the feedwater flow to one steam generator relative to the feedwater flow to the other steam generator adjusted as required to maintain the average coolant temperatures in loops A and B equal.

The feed forward control signal as modified in function generator 62A operates, in parallel, a valve 75 regulating the feedwater flow to steam generator 3 and a valve 76 regulating the feedwater flow to steam generator 4. Total feedwater flow to steam generators 3 and 4 is maintained equal to the demand by a feedback loop comprising flow transmitter 77, difference unit 78 and proportional plus integral unit 79. The output signal generated in proportional plus integral unit 79 is transmitted through conductors 80 and 81 to summing units 82 and 83 respectively and hence adjusts feedwater flow to steam generators 3 and 4 equally. Thus, under normal conditions, the steam outputs from the steam generators are maintained equal. A local feedback loop is provided for steam generator 3 comprising flow transmitter 84, difference unit 85 and proportional plus integral unit 86. A similar feedback loop is provided for steam generator 4 comprising flow transmitter 87, difference unit 88 and proportional plus integral unit 89. Thus the feedwater flow to steam generator 3 is maintained proportional to the output signal from summing unit 82 and the feedwater flow to steam generator 4 is maintained proportional to the output signal from summing unit 83. In summation, the feedwater control so far described operates to maintain the total feedwater flow to steam generators 3 and 4 in proportion to the signal generated in summing unit 65 while maintaining the feedwater flow to steam generator 3 proportional to the output signal from summing unit 82 and the feedwater flow to steam generator 4 proportional to the output signal from summing unit 83.

Such equality of feedwater flow to steam generators 3 and 4 is, however, continuously modified, as required, to maintain the average coolant temperatures in loops A and B equal. As shown in FIG. 3, the output signal from summing unit 52 is proportional to the average of the coolant temperatures in loop A entering and leaving the reactor 1 and the output signal from summing unit 53 is proportional to the average of the coolant temperatures in loop B entering and leaving the reactor 1. As shown in FIG. 2 an output signal proportional to the difference in loop A and loop B coolant temperatures is generated in difference unit 90 and through proportional plus integral unit 91 and summing unit 92 inputs to a multiplying unit 93 receiving the output signal from summing unit 65. Thus the feed forward control signal establishing the rate of feedwater flow to steam generator 3 is modified in accordance with the difference between the average coolant temperatures in loops A and B. If the average coolant temperature in loop A is less than the average coolant temperature in loop B, the feedwater flow to steam generator 3 will be decreased and vice versa.

Simultaneously, with the change in feedwater flow to steam generator 3 the control operates to produce an equal but opposite change in feedwater flow to steam generator 4. The output signal from multiplying unit 93, representative of the demand for feedwater flow to steam generator 3 is applied through signal conductor 94 to difference unit 95 and thus subtracts from the output signal from summing unit 65 an amount corresponding to the feedwater flow demand to steam generator 3. The output signal from difference unit 95, proportional to the difference between total feedwater demand and the steam generator 3 feedwater demand, is thus the correct feedwater demand for steam generator 4.

The override control from average coolant loop temperature difference, while being of high accuracy, is relatively slow in response for the reason that it is dependent upon temperature measurements which have a relatively long time constant. Such changes in average coolant temperatures as may be caused by a gradual fouling of one steam generator as compared to the other one are satisfactorily handled. In order to handle rapid, violent, and possibly catastrophic changes in average coolant temperatures as might be caused, for example, by the outage of a coolant pump, my invention further comprehends making immediate changes in the relative rates of feedwater flow to the steam generators in a push-pull fashion to approximate the resulting change in difference in average coolant loop temperatures. Following such approximation, the control operating from the difference in average coolant loop temperatures, introduces a relatively slow, continuing change until the average coolant loop temperatures are restored to equality.

In FIG. 2 this principle is illustrated as applied to an abrupt change in coolant flow as might be caused by the loss of a coolant pump in loop A or B. Any change in coolant flow in one loop as compared to the coolant flow in the other loop produces a proportional change in the relative rates of feedwater flow to the steam generators, anticipating the change in average coolant temperatures which would result from such a change in the relative coolant loop flows.

Function generator 96 generates an output signal corresponding to coolant flow through loop A as determined by a flow transmitter 97. Function generator 98 generates an output signal corresponding to coolant flow through loop B as determined by a flow transmitter 99. These two output signals are compared in a difference unit 100 and the output signal therefrom inputs to summing unit 92. Upon a decrease in coolant flow through loop A, as caused, for example, by the outage of coolant pump 7, the control operates to proportionately decrease the flow of feedwater to steam generator 3 and effect a proportionate increase in feedwater flow to steam generator 4 and vice versa. Thereafter the control from the difference in average loop temperatures modifies the change in the relative rates of feedwater flow on a continuing basis until the average loop temperatures are equal.

This principle is further illustrated in FIG. 2 as applied to anticipate differences in average coolant loop temperatures caused by changes in the relative feedwater temperatures to steam generators 3 and 4, resulting, for example, from the outage of a feedwater heater. Assume, for example, the outage of feedwater heater 29. The expected result would be a lowering of the temperature of the coolant entering reactor 1 from steam generator 3 and thus lowering the average loop A coolant temperature. My invention anticipates this change by making an immediate change to the feedwater flow rates to the steam generators. Bias control action from difference unit 101 acting on summing unit 92 to the multiplying unit 93 increases the feedwater flow to steam generator 4 and decreases the feedwater flow to steam generator 3.

In the interest of brevity, there has been omitted from the drawings and description, details where such details are not germane to the invention and subject to alternate well known types. Thus, for example, in FIG. 1 steam generators 3 and 4 would be provided with multiple parallel tubes as customarily employed in once-through steam generators. Similarly, the control rod drives 102 and nuclear power transmitter 48 are shown in block diagram to indicate that the control system may be applied to any one of the several types available for adjusting nuclear power level and the measurement thereof. Further, the usual and well known protective systems and limiting controls employed in a nuclear power plant would be included. As such systems and controls form no part of the present invention they have been omitted from the drawings and description.

It will be apparent that the control system illustrated and described is by way of example only and that various modifications can be made within the scope of the invention as defined in the appended claims.

I claim:

1. In a control system for a nuclear power producing unit comprising a pressurized water reactor, a once-through steam generator provided with feedwater supply means, a turbine-generator supplied with steam from the steam generator and means maintaining a flow of pressurized water through the reactor and steam generator, the combination comprising; means generating a feed forward control signal proportional to the desired power output of the power producing unit, a second means for adjusting the reactor heat release, a third means for adjusting the rate of flow of feedwater to the steam generator, said second and third means solely responsive to and operated in parallel from said feed forward control signal whereby the reactor heat release and the rate of flow of feedwater to the steam generator are each maintained in a discrete functional relationship to said feed forward control signal.

2. In a control system as set forth in claim 1 further including a fourth means for adjusting the rate of flow of steam from the steam generator to the turbine, said fourth means solely responsive to and operated in parallel with said second and third means from said feed forward control signal.

3. In a control system as set forth in claim 1 further including a function generator responsive to said feed forward signal and producing a modified feed forward signal, said second means responsive to said modified feed forward signal.

4. In a control system as set forth in claim 1 further including means modifying the response of said second means to said feed forward signal in proportion to the time integral of the difference between the desired and actual power output of the power producing unit.

5. In a control system as set forth in claim 2 wherein the nuclear power producing unit has a plurality of critical parameters, further including means modifying the discrete response of said second, third and fourth means in proportion to changes in the magnitudes of said plurality of parameters.

6. In a control system as set forth in claim 1 further including means modifying the response of said third means to said feed forward signal in proportion to the time integral of the deviation in the average of the temperatures of the said pressurized water entering and leaving the reactor from set point.

7. In a control system as set forth in claim 6 further including means modifying the response of said third means in accordance with the average of the temperatures of the said pressurized water entering and leaving the reactor from set point in proportion to the difference between the desired and actual power output of the power producing unit.

8. In a control system as set forth in claim 1 further including means modifying the response of said third means to said feed forward signal in functional relationship to changes in the rate of said pressurized water flow through the steam generator.

9. In a control system as set forth in claim 1 further including means modifying the response of said third means to said feed forward control signal in proportion to changes in the temperature of the feedwater entering the steam generator.

10. In a control system as set forth in claim 1 wherein the nuclear power producing unit includes a second once-through steam generator provided with feedwater supply means and supplying steam to the turbine-generator and means maintaining said pressurized water flow through the reactor and said second steam generator, the combination further comprising; means for maintaining the total rate of feedwater flow to said generators in a discreet functional relationship to said feed forward signal.

11. In a control system as set forth in claim 10 further including means for adjusting the relative rates of feedwater flow to the steam generators in accordance with the difference in the average temperatures of the said pressurized water entering and leaving said first named steam generator and said second steam generator.

12. In a control system as set forth in claim 11 further including means adjusting the relative rates of feedwater flow to the steam generators in accordance with the time integral of the difference in said average temperatures.

13. In a control system as set forth in claim 10 further including means for adjusting the relative rates of feedwater flow to the steam generators in accordance with changes in the relative rates of said pressurized water flow through the steam generators.

14. The combination as set forth in claim 10 further including means for adjusting the relative rates of feedwater flow to the steam generators in proportion to the difference in temperatures of the feedwater supplied the steam generators.

15. The combination as set forth in claim 10 further including means for adjusting the relative rates of feedwater flow to the steam generators in accordance with the algebraic sum of the difference in the average of the temperatures of the said pressurized water entering and leaving the steam generators, the relative rates of said pressurized water flow through the steam generators and the difference in temperature of the feedwater supplied the steam generators.

* * * * *